US010853949B2

(12) United States Patent
Komiya et al.

(10) Patent No.: US 10,853,949 B2
(45) Date of Patent: Dec. 1, 2020

(54) IMAGE PROCESSING DEVICE

(71) Applicant: HITACHI KOKUSAI ELECTRIC INC., Tokyo (JP)

(72) Inventors: Yuichiro Komiya, Tokyo (JP); Muneaki Yamaguchi, Tokyo (JP); Hiroaki Nakakita, Tokyo (JP); Kazunari Iwanaga, Tokyo (JP); Junichi Togashi, Tokyo (JP); Yohei Akimoto, Tokyo (JP); Masaya Okada, Tokyo (JP); Atsushi Sassa, Tokyo (JP); Wataru Ito, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 63 days.

(21) Appl. No.: 16/327,745

(22) PCT Filed: Sep. 21, 2017

(86) PCT No.: PCT/JP2017/034088
§ 371 (c)(1),
(2) Date: Feb. 22, 2019

(87) PCT Pub. No.: WO2018/061976
PCT Pub. Date: Apr. 5, 2018

(65) Prior Publication Data
US 2019/0180447 A1     Jun. 13, 2019

(30) Foreign Application Priority Data

Sep. 28, 2016  (JP) .................................. 2016-189208

(51) Int. Cl.
*G06T 7/20*     (2017.01)
*H04N 7/18*     (2006.01)

(52) U.S. Cl.
CPC ................. *G06T 7/20* (2013.01); *H04N 7/18* (2013.01); *H04N 7/188* (2013.01); *G06T 2207/10016* (2013.01); *G06T 2207/30196* (2013.01)

(58) Field of Classification Search
CPC ............. G06T 7/20; G06T 2207/30196; G06T 2207/10016; H04N 7/188; H04N 7/18; (Continued)

(56) References Cited

U.S. PATENT DOCUMENTS

2009/0220123 A1     9/2009  Tojo
2015/0146006 A1 *   5/2015  Kawano ................. H04N 5/247
                                                348/159

(Continued)

FOREIGN PATENT DOCUMENTS

JP     2005346261 A    12/2005
JP     2007180709 A     7/2007

(Continued)

OTHER PUBLICATIONS

Miyazaki, Shinji, et al. "New congestion estimation system based on the 'crowd behavior analysis technology'." NEC Technical Journal 9.1 (2015): 78-81.*

(Continued)

*Primary Examiner* — Neil R McLean
(74) *Attorney, Agent, or Firm* — McDermott Will & Emery LLP

(57)  ABSTRACT

The purpose of the present invention is to provide a technology which adaptively switches video analysis methods according to a congestion situation within a video, and which carries out a suitable video analysis by a limited computational volume. Provided is an image processing device 100, wherein a congestion estimation unit 102 estimates a congestion situation within a video which is (Continued)

acquired from an image input unit 101. A control unit 103 switches methods for video analysis according to the congestion situation. In a situation of low congestion, an image analysis unit for use in normal situations 105 carries out the video analysis by a basic method. In a situation of high congestion, an image analysis unit for use in congested situations 106 carries out a high-precision video analysis, such as an analysis which spans a plurality of frames.

4 Claims, 4 Drawing Sheets

(58) Field of Classification Search
CPC ............. G06K 9/6227; G06K 9/00778; G06K 9/00771
See application file for complete search history.

(56) References Cited

U.S. PATENT DOCUMENTS

2016/0063712 A1 3/2016 Matsumoto
2016/0133025 A1* 5/2016 Wang ................ G06K 9/00778
348/135

FOREIGN PATENT DOCUMENTS

| | | |
|---|---|---|
| JP | 2009211274 A | 9/2009 |
| JP | 2011008382 A | 1/2011 |
| JP | 2011113543 A | 6/2011 |
| JP | 2014006586 A | 1/2014 |
| JP | 2016037387 A | 3/2016 |
| JP | 2016048834 A | 4/2016 |
| JP | 2017/034088 A1 | 10/2017 |
| WO | 2016021147 A1 | 2/2016 |

OTHER PUBLICATIONS

International Search Report issued in International Application No. PCT/JP2017/034088, dated Oct. 31, 2017.

* cited by examiner

FIG. 3
(a)
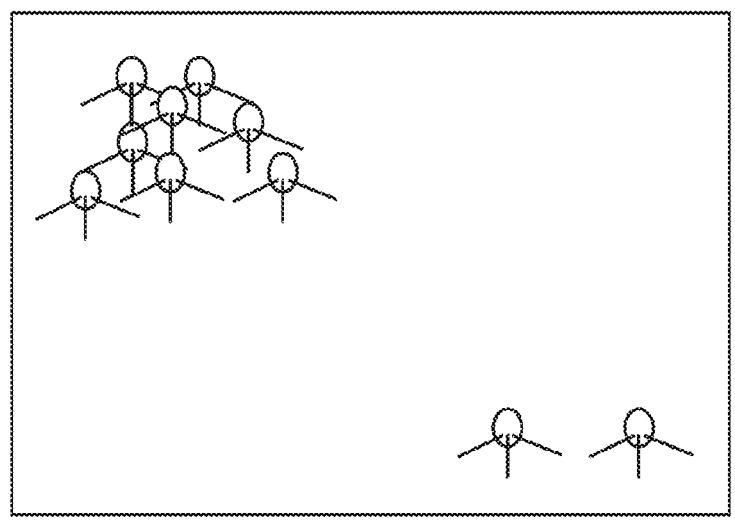
(b)
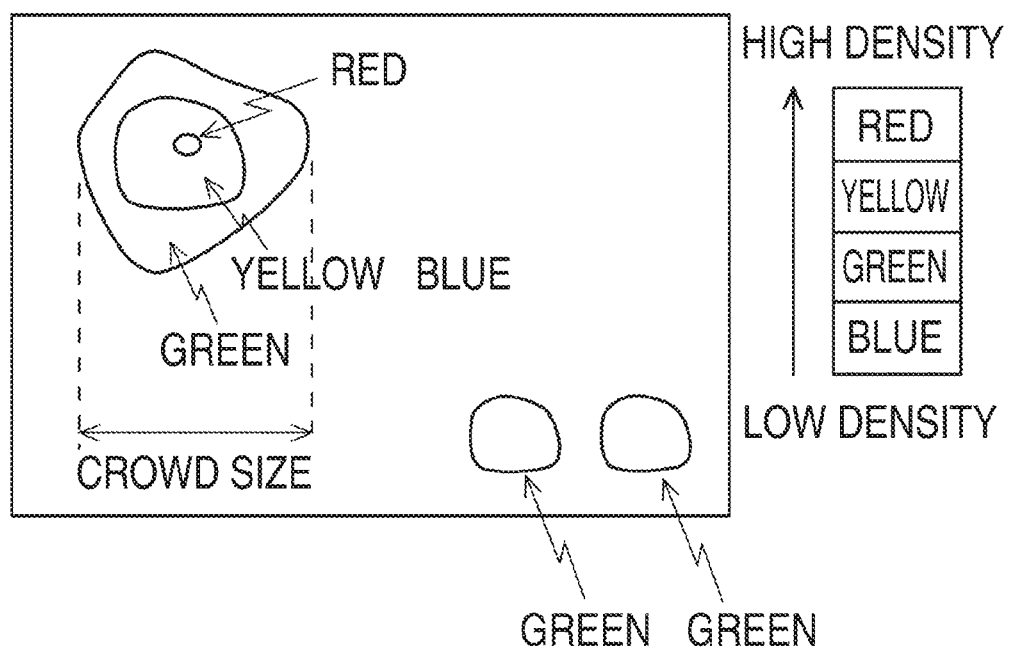

IMAGE PROCESSING DEVICE

CROSS REFERENCE

This application is a U.S. National Phase under 35 U.S.C. § 371 of International Application No. PCT/JP2017/034088, filed on Sep. 21, 2017 which claims the benefit of Japanese Application No. 2016-189208, filed on Sep. 28, 2016, the entire contents of both are hereby incorporated by reference.

TECHNICAL FIELD

The present invention relates to an image processing device that extracts information from video images in a video device by a video image analysis technique.

BACKGROUND ART

There have been proposed techniques for, in a video monitoring system, analyzing video images in a monitoring camera to automatically estimate the status of an imaging location. For example, there are techniques for detecting a person at a standstill and an object left unattended from the video images of the monitoring camera (for example, refer to Patent Literatures 1 and 2). According to these image processing techniques, difference processing is used to detect an object at a standstill and left unattended by two images generated from shot image frames obtained in different durations. Further, there is another technique by which the degree of reliability in each image region is calculated to suppress a false alarm with improvement in reliability.

CITATION LIST

Patent Literatures

PATENT LITERATURE 1: WO 16/021147
PATENT LITERATURE 2: JP-A-2016-037387
PATENT LITERATURE 3: JP-A-2005-346261
PATENT LITERATURE 4: WO 15/119044

SUMMARY OF INVENTION

Technical Problem

According to the foregoing methods, the issue of a false alarm can be suppressed in a region where many persons come and go, but it is not possible to detect a person at a standstill and an object left unattended. To detect a person at a standstill and an object left unattended in a place where many persons come and go, the motion of an object may be tracked in a plurality of frames, for example, so that individual objects can be separately captured. However, such a method requires a large amount of arithmetic computation as compared to the method for detecting an object by a difference between images described above. Accordingly, there is a demand for introduction of another technique.

The present invention is devised in light of these circumstances, and an object of the present invention is to solve the foregoing problem.

Solution to Problem

The present invention relates to an image processing device that extracts information from a video image shot by a video device and includes: a congestion degree estimator that estimates a congestion degree in a shooting region in real time based on the video image; a plurality of image analyzers that extracts information on an object other than a background from the video image using a plurality of image analysis techniques; and a controller that selects an image analyzer to be used for image analysis from the plurality of image analyzers according to the estimated congestion degree.

The plurality of image analysis techniques may include a first analysis technique for real-time processing and a second analysis technique for non-real-time processing. The information on the object may include information relating to a region of a person and a region of a left object. The image processing device may include an image recorder that records the video image. The image analyzer may acquire a video image for use in the image analysis from the image recorder according to historical information on a change in the congestion degree and perform image analysis by the second analysis technique.

A plurality of the video devices may be provided. A plurality of the congestion degree estimators may be provided corresponding to the plurality of video devices to estimate respective congestion degrees in the video images. The controller may select the image analysis unit for use in the image analysis according to the respective congestion degrees in the video images from the plurality of video devices such that the second analysis technique is more prone to be selected as the congestion degrees are higher.

Advantageous Effects of Invention

According to the present invention, an object of the present invention is to provide a technique for performing preferred video image analysis by a limited amount of arithmetic computation in such a manner as to switch adaptively between video image analysis methods according to the congestion status in the video image.

BRIEF DESCRIPTION OF DRAWINGS

FIG. 3 is a diagram illustrating the relationship between crowd and heat map according to the first embodiment.

DESCRIPTION OF EMBODIMENTS

Next, a mode for carrying out the present invention (hereinafter, simply called "embodiment") will be specifically described with reference to the drawings.

First Embodiment

Figure 1:
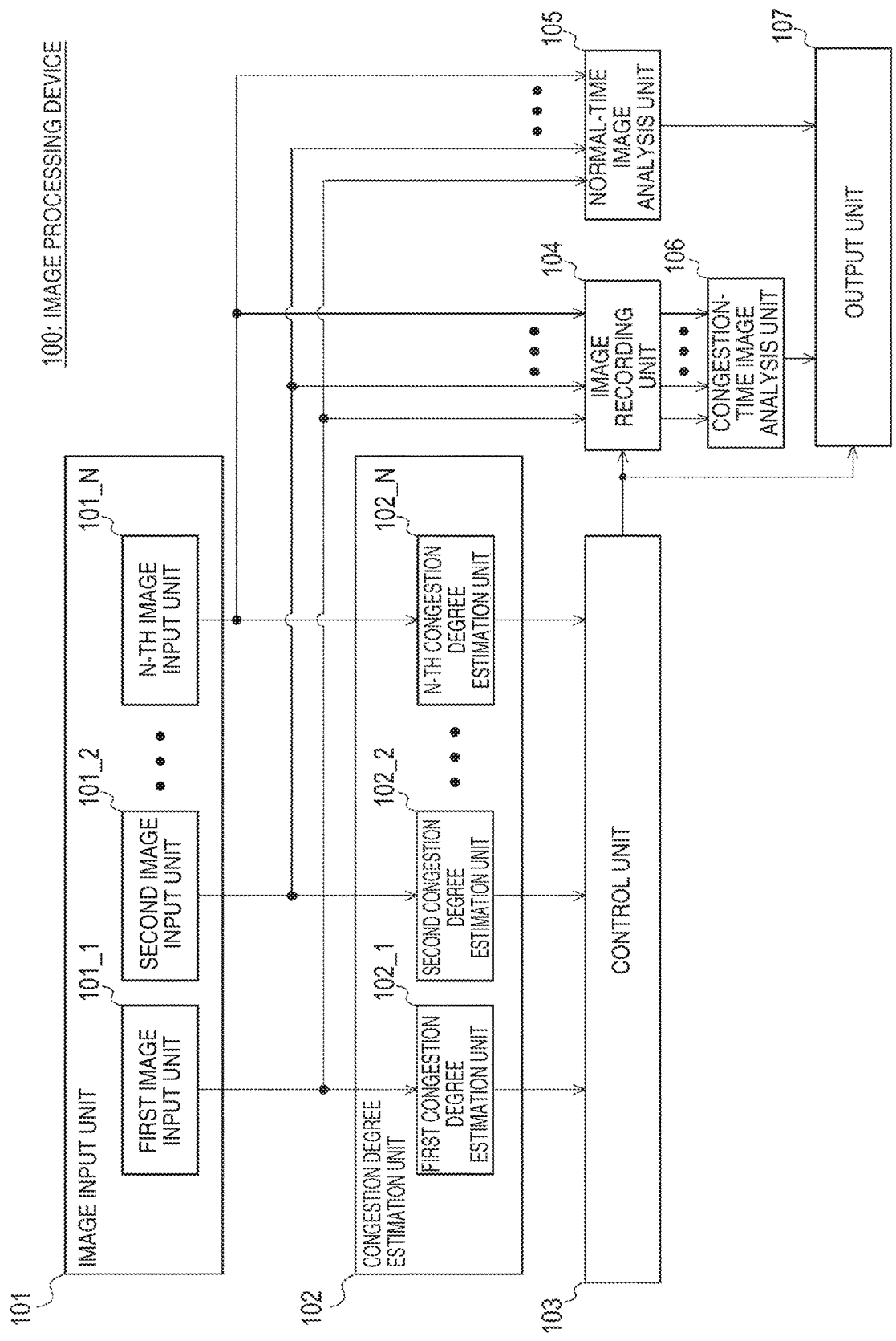
FIG. 1 is a block diagram illustrating a configuration of an image processing device according to a first embodiment.

FIG. 1 is a block diagram illustrating a configuration of an image processing device 100 according to the present embodiment. The image processing device 100 is a device acting as a monitoring system that includes an image input unit 101, a congestion degree estimation unit 102, a control unit 103, an image recording unit 104, a normal-time image analysis unit 105, a congestion-time image analysis unit 106, and an output unit 107.

The image input unit 101 includes an arbitrary number N of first to N-th image input units 101_1 to 101_N. The congestion degree estimation unit 102 includes N first to N-th congestion degree estimation units 102_1 to 102_N.

Each of the first to N-th image input units 101_1 to 101_N is an imaging device (imaging element) such as a monitoring camera or an interface with the same, which acquires video images of a road or the like where persons come and go and outputs the same to the first to N-th congestion degree estimation units 102_1 to 102_N and the normal-time image analysis unit 105.

The first to N-th congestion degree estimation units 102_1 to 102_N estimate the congestion degrees from the video images acquired from the first to N-th image input units 101_1 to 101_N. The congestion degree is estimated from the amount of a change in edge between image frames (hereinafter, simply called "frames") constituting the video images, as described in PATENT LITERATURE 4, for example. The first to N-th congestion degree estimation units 102_1 to 102_N can be formed integrally with a decoder that decodes video images coded by H.264 or the like. In that case, the congestion degrees can be estimated from the amount of codes generated by predictive coding.

Figure 2:
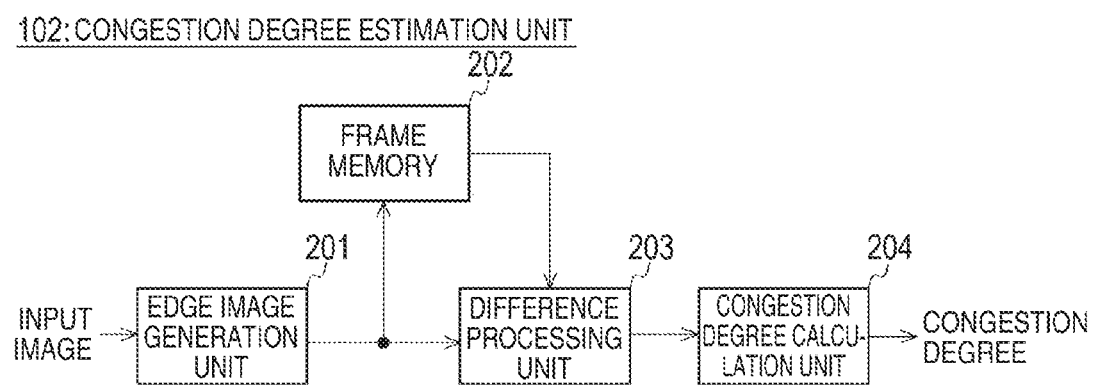
FIG. 2 is a block diagram of a congestion degree estimation unit according to the first embodiment.

FIG. 2 is a block diagram illustrating a configuration of each of the first to N-th congestion degree estimation units 102_1 to 102_N, which are indicated as "congestion degree estimation unit 102" in the drawing. To perform the congestion degree estimation method in the present embodiment, the congestion degree estimation unit 102 includes an edge image generation unit 201, a frame memory 202, a difference processing unit 203, and a congestion degree calculation 204.

The edge image generation unit 201 generates edge images in which an edge is extracted based on Canny algorithm, for example, from the input image acquired from the first image input unit 101_1, and outputs the same to the frame memory 202 and the difference processing unit 203. The edge images described in this example includes images generated by various filters for extracting contours and textures.

The frame memory 202 holds one frame of edge images acquired from the edge image generation unit 201 and outputs the same with a delay to the difference processing unit 203.

The difference processing unit 203 takes the difference between two edge images input at different times to generate an edge difference image. Specifically, the difference processing unit 203 generates the edge difference image from the edge image directly acquired from the edge image generation unit 201 and the edge image acquired from the frame memory 202 and outputs the same to the congestion degree calculation unit 204. The difference may be either the arithmetic difference (absolute value) between multiple pixel values or exclusive OR of binarized pixel values.

The congestion degree calculation unit 204 extracts the amount of a change in edge from the edge difference image acquired from the difference processing unit 203, estimates the congestion degree from the value (change amount), and outputs the estimated congestion degree as congestion degree estimated value to the control unit 103. For example, the value obtained by adding up the absolute values of edge differences within one frame (the edge change amount itself) may be set as the congestion degree. Alternatively, the relationship between the congestion degree and the edge change amount may be determined by mechanical learning such as regression analysis. These congestion degrees indicate average congestion degrees in a viewing angle of an image. The congestion degree calculation unit 204 may be integrated in a server performing image processing, for example, or may be included in the imaging device such as a monitoring camera.

Additional processing by the congestion degree calculation unit 204 will be described with reference to FIG. 3. The congestion degree calculation unit 204 optionally performs crowd measurement from the monitoring video images. For example, the congestion degree calculation unit 204 represents crowds by a heat map based on the monitoring video images, and measures the scales (spatial sizes) of the crowds and the congestion degrees of the individual crowds.

FIG. 3 is a diagram illustrating the relationship between crowd and heat map. FIG. 3(a) illustrates a monitoring video image in which crowds are seen, and FIG. 3(b) provides a heat map of the crowds. First, the congestion degree calculation unit 204 performs predetermined image processing on the monitoring video image in which the crowds are seen to generate a heat map image that expresses crowd congestion levels by contour lines as illustrated in FIG. 3(b). In this example, the crowd levels are indicated in the descending order of blue<green<yellow<red. That is, a crowd level at a low density is indicated in "blue" on the heat map. A high crowd level at a high density is indicated in "red" on the heat map.

The heat map image is formed by accumulating the edge difference images acquired from the difference processing unit 203 for a predetermined time and applying a spatial filter such as a Gaussian filter to the cumulative image. To measure precisely only crowds of persons, there is a method by which to, before the accumulation, perform clustering of the pixels with large edge differences and exclude moving objects smaller in size than person. Next, the congestion degree calculation unit 204 specifies a region of a crowd size in the yellow or higher level, for example, and measures the width and area of the region. When the width is to be used as crowd size, the coordinates of both ends (both side ends as seen in the X axis direction) of the region are converted into world coordinate systems by using a homography matrix, and then the distance between the coordinate systems is calculated to measure the crowd size. That is, since it can be assumed that a crowd substantially exists on a horizon plane, homography conversion can be used to project a plane onto another plane. Depending on the process load and the processing performance, methods for measuring the number of crowd levels and the crowd size may be selected.

The descriptions will be given returning to FIG. 2. The control unit 103 determines whether there is a congestion state based on the congestion degree estimation value acquired from the congestion degree estimation unit 102, detects an input image indicating the congestion state, and outputs the information on the input image. In this case, the control unit 103 records the transition of the N congestion degrees (congestion degree estimation values) acquired from the first to N-th congestion degree estimation units 102_1 to 102_N. Then, when the integrated value within a certain period of time exceeds a threshold, for example, the control unit 103 determines that the input images at a congestion degree n indicate a congestion state, and outputs information on the congestion state (congestion information) to the image recording unit 104 and the output unit 107.

In the process of the present embodiment, the congestion-time image analysis unit 106 capable of a large amount of arithmetic computation performs only the input images determined as indicating a congestion state. If the congestion-time image analysis unit 106 is capable of processing only an arbitrary number L (L<N) of images, when the number of the input images determined as indicating a congestion state is larger than L, the congestion-time image analysis unit 106 extracts L input images in the descending order of the integrated value of congestion degrees, and outputs these input images as input images indicating a congestion state.

The image recording unit 104 records the video images acquired from the first to N-th image input units 101_1 to 101_N in a non-volatile storage medium such as a hard disc. Upon receipt of the congestion information from the control unit 103, the image recording unit 104 outputs the recorded video images. Since time-shift playback may constitute a hindrance to writing into the hard disc, the video images held in a temporary memory such as a write buffer may be output.

The normal-time image analysis unit 105 analyzes the N input images acquired from the first to N-th image input units 101_1 to 101_N substantially in real time, and outputs the analysis results. For example, in the case of detecting an object left unattended, a foreground region is extracted as an interest region by background difference processing. When the foreground region exists for a certain period of time or more, the foreground region is detected as an object left unattended. In the case of counting the number of persons, when the spatial size of an interest region extracted in the same manner matches the presumed size of a person, the interest region is counted as one person. Depending on the spatial size of an interest region, the one interest region may be counted as a plurality of persons. To count the number of persons, there are a method by which to count all persons in an image and a method by which to count persons passing through a determination line provided in an image.

The technique for detecting an object left unattended (including a person at a standstill) described above is based on background difference, which may cause frequent false detection in a congestion state in which the influence of moving objects is strongly left on the background image. Accordingly, the prevention of false detection requires high-load processing with an increased amount of processing information. For example, in the video images in which a plurality of persons is densely seen without clearance, the interest region continues to remain in the same place and thus the count of passing persons does not increase even when the crowd is moving.

The congestion-time image analysis unit 106 simultaneously analyzes the L input images at the maximum acquired from the image recording unit 104 and outputs the analysis results. The images acquired by the congestion-time image analysis unit 106 are input images that have been determined as indicating a congestion state by the control unit 103. Accordingly, it is necessary to use a system that preferably operates even at congestion times.

The video images input into the congestion-time image analysis unit 106 are output from the video recording device 103 and thus do not necessarily need to be processed in real time but may be processed at a lower or higher rate than the shooting rate of the video images. In addition, to count the number of persons by tracking feature points immediately after the determination of the congestion state, the control unit 103 may process the video images before the control unit 103 determines the input images as indicating the congestion state.

To detect an object left unattended, for example, there is a technique for detection by tracking feature points, for example. The feature points refer to points suitable for tracking in a screen by image processing. There are known techniques for feature point tracking such as well-known corner detection (Harris, FAST, Shi-Tomasi, and others) and scale invariant feature transform (SIFT). According to this technique, feature points are tracked in a plurality of frames to extract the paths of the feature points. The extracted paths are clustered according to motion behavior so that individual objects can be separately extracted. This technique is applicable to detection of a left object and estimation of correct congestion degrees (in particular, the number of persons). For example, when there exists a cluster of feature points without motion in the screen for a certain period of time or more, these feature points is not detected from the background image, and the spatial size of the cluster matches the presumed size of a left object, the cluster is detected as a left object. In addition, a cluster of feature points in a motion corresponding to the walking speed of a person is detected as one or more persons or (part of) a crowd according to the spatial size of the cluster.

The video images to be used for detection image analysis of a left object and a standstill state are acquired from the video recording device according to historical information on changes in the congestion degree.

The video images to be used for image analysis are acquired from the video recording device according to historical information on changes in congestion degree. The image analysis technique used by the congestion-time image analysis unit 106 described above has a larger amount of arithmetic computation than that of the technique used by the normal-time image analysis unit 105. However, the use of an external device using a field-programmable gate array (FPGA) and a general-purpose computing on graphics processing unit (GP-GPU) allows real-time operations, for example.

The output unit 107 integrates the analysis results of the input video images and outputs the same.

In this manner, the image processing device 100 estimates the congestion status in the video images and switches the method for video image analysis depending on the estimated congestion status. For example, when the congestion degree is low, the image processing device 100 performs video image analysis by a simple method, and when the congestion degree is high, the image processing device 100 performs high-accuracy video image analysis such as analysis in a plurality of frames. As a result, it is possible to, while adaptively switching the video image analysis method according to the congestion status in the video images, perform high-accuracy video image analysis by a limited amount of arithmetic computation.

Second Embodiment

Figure 4:
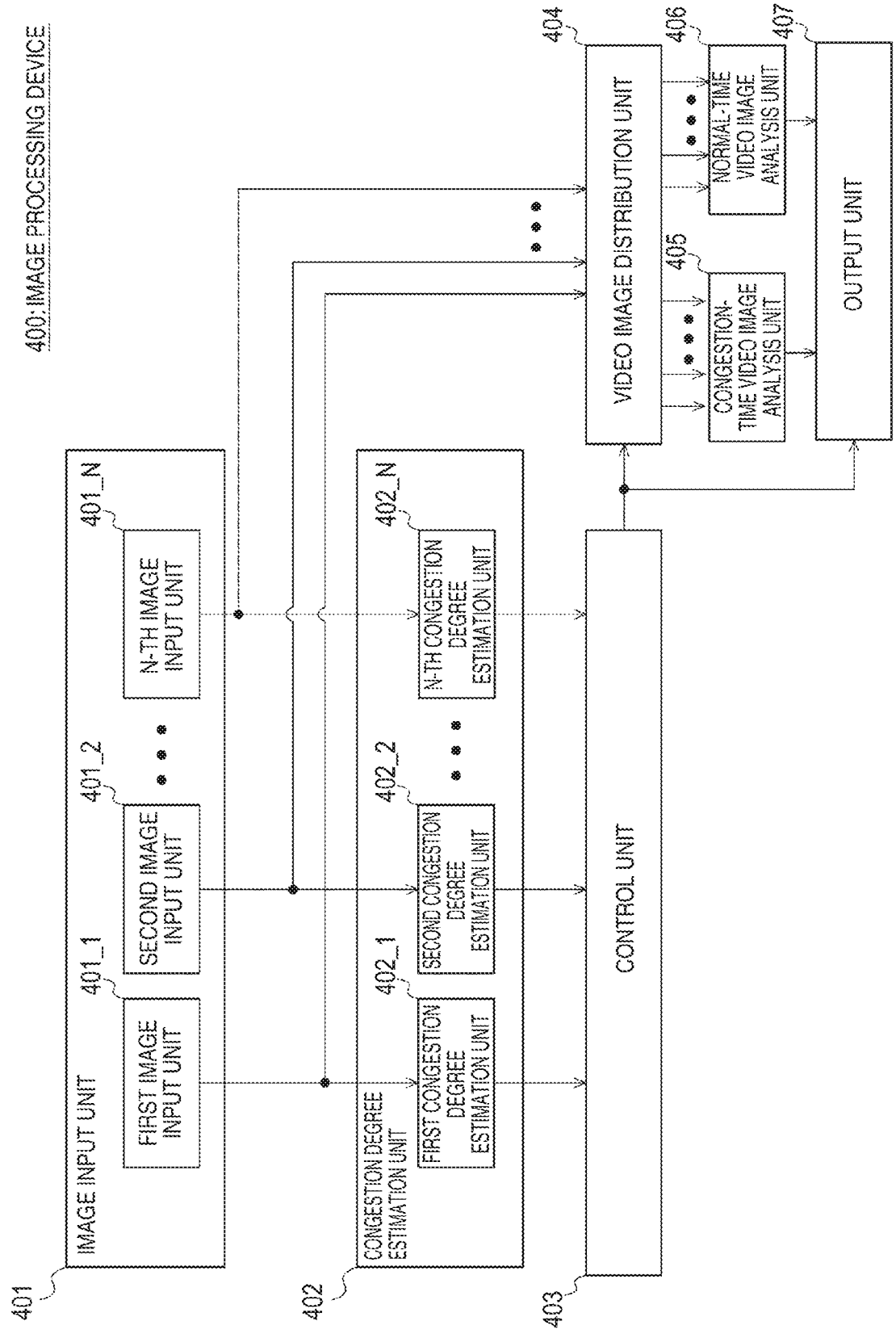
FIG. 4 is a block diagram illustrating a configuration of an image processing device according to a second embodiment.

FIG. 4 is a block diagram illustrating a configuration of an image processing device 400 according to the present embodiment. The image processing device 400 does not have the function of recording video images but performs real-time video image analysis of video images acquired from an image input unit 401 (first to N-th image input units 401_1 to 401_N). Specific configuration is as described below.

The image processing device 400 includes an image input unit 401, a congestion degree estimation unit 402, a control unit 403, a video distribution unit 404, a congestion-time video analysis unit 405, a normal-time video analysis unit 406, and an output unit 407.

The image input unit 401 includes an arbitrary number N of first to N-th image input units 401_1 to 401_N. The congestion degree estimation unit 402 includes N first to N-th congestion degree estimation units 402_1 to 402_N.

The first to N-th image input units 401_1 to 401_N are connected to imaging devices such as monitoring cameras, acquire video images from those imaging devices, and output the video images to the first to N-th congestion degree estimation units 402_1 to 402_N and the video distribution unit 404.

The first to N-th congestion degree estimation units 402_1 to 402_N estimate the congestion degrees from the video images acquired from the first to N-th image input units 401_1 to 401_N. The method for estimating the congestion degree is the same as that in the first embodiment.

Based on information from the control unit 403, out of the acquired N input images (video images), the video distribution unit 404 outputs L video images to the congestion-time video analysis unit 405 and outputs M video images to the normal-time video analysis unit 406. In this case, N=L+M.

Specifically, having acquired the estimation results of the congestion degrees in the video images from the control unit 403, out of the video images based on which the congestion degrees were estimated, the video distribution unit 404 outputs the L video images with higher congestion degrees to the congestion-time video analysis unit 405 and outputs the M video images with lower congestion degrees to the normal-time video analysis unit 406.

The congestion-time video analysis unit 405 performs real-time image analysis of the input image with higher congestion degrees, and the normal-time video analysis unit 406 performs real-time image analysis of the input images with lower congestion degrees.

As a result, distributing high computing performance to the congestion-time video analysis unit 405 and distributing relatively low computing performance to the normal-time video analysis unit 406 allows optimization of processing performance and real-time image analysis. When these analysis units are equal in computing performance, input images can be distributed such that a smaller number of images is distributed to the congestion-time video analysis unit 405 and a larger number of images is distributed to the normal-time video analysis unit 406. In any case, it is possible to optimize computing performance.

The present invention has been described so far based on an embodiment. This embodiment is a mere example and it is to be understood by persons skilled in the art that combinations of components of the embodiment can be modified in various manners and those modifications fall within the scope of the present invention. For example, in the foregoing embodiment, switching takes place between the normal-time image analysis unit 105 (the normal-time video analysis unit 406) and the congestion-time image analysis unit 106 (the congestion-time video analysis unit 405) according to the case with a high congestion degree and the case with a low congestion degree. Alternatively, three or more image analysis units (video analysis units) may be provided such that switching takes place among the image analysis units (the video analysis units) to be used according to the congestion degree.

REFERENCE SIGNS LIST

100, 400 Image processing device
101, 401 Image input unit
101_1, 401_1 First image input unit
101_2, 401_2 Second image input unit
101_3, 401_3 Third image input unit
101_N, 401_N N-th image input unit
102, 402 Congestion degree estimation unit
102_1, 402_1 First congestion degree estimation unit
102_2, 402_2 Second congestion degree estimation unit
102_3, 402_3 Third congestion degree estimation unit
102_N, 402_N N-th congestion degree estimation unit
103, 403 Control unit
104 Image recording unit
105 Normal-time image analysis unit
106 Congestion-time image analysis unit
107, 407 Output unit
201 Edge image generation unit
202 Frame memory
203 Difference processing unit
204 Congestion degree calculation unit
404 Video distribution unit
405 Congestion-time video analysis unit
406 Normal-time video analysis unit

The invention claimed is:

1. An image processing device that extracts information from a video image shot by a video device, the image processing device comprising:
   a controller that:
      estimates a congestion degree in a shooting region in real time based on the video image;
      extracts information on an object other than a background from the video image using a plurality of image analysis techniques including a first analysis technique for real-time processing and a second analysis technique for non-real-time processing, the information on the object including information relating to a region of a person and a region of a left object; and
      selects one of the plurality of image analysis techniques to be used for image analysis according to the estimated congestion degree; and
   an image recorder that records the video image,
   wherein the controller acquires a video image for use in the image analysis from the image recorder according to historical information on a change in the congestion degree and performs image analysis using the second analysis technique.

2. The image processing device according to claim 1,
   wherein a plurality of the video devices may be provided,
   wherein respective congestion degrees in the video images are estimated for the plurality of video devices, and
   wherein the controller selects one of the plurality of image analysis techniques to be used in the image analysis according to the respective congestion degrees in the video images from the plurality of video devices such that the second analysis technique is more prone to be selected as the congestion degrees are higher.

3. The image processing device according to claim 1, wherein crowds in the video image are represented by a heat map based on the video image and measures sizes of the crowds and congestion degrees in the individual crowds.

4. The image processing device according to claim 1,
   wherein the controller performs 1) a congestion-time video analysis that analyzes an input image with a high congestion degree and 2) a normal-time video analysis that analyzes an input image with a low congestion degree,
   wherein each of the congestion-time video analysis and normal-time video analysis is a real-time image analysis,
   wherein high computing performance is used to perform the congestion-time video analysis, and wherein relatively low computing performance is used to perform the normal-time video analysis.

\* \* \* \* \*